United States Patent
Watanabe et al.

(10) Patent No.: US 10,315,621 B2
(45) Date of Patent: Jun. 11, 2019

(54) VEHICLE LOCKING AND UNLOCKING CONTROL SYSTEM

(71) Applicant: HONDA MOTOR CO., LTD., Minato-ku, Tokyo (JP)

(72) Inventors: Tomonori Watanabe, Wako (JP); Katsuyasu Yamane, Wako (JP); Masashi Sugita, Wako (JP); Daisuke Matsui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/080,051

(22) PCT Filed: Mar. 9, 2016

(86) PCT No.: PCT/JP2016/057361
§ 371 (c)(1),
(2) Date: Aug. 27, 2018

(87) PCT Pub. No.: WO2017/154132
PCT Pub. Date: Sep. 14, 2017

(65) Prior Publication Data
US 2019/0054896 A1    Feb. 21, 2019

(51) Int. Cl.
*B60R 25/10*    (2013.01)
*B60R 25/20*    (2013.01)
(Continued)

(52) U.S. Cl.
CPC ...... *B60R 25/1003* (2013.01); *B60R 25/1001* (2013.01); *B60R 25/1004* (2013.01);
(Continued)

(58) Field of Classification Search
USPC ........................................................ 340/430
See application file for complete search history.

(56) References Cited

U.S. PATENT DOCUMENTS

| 9,792,806 B2 * | 10/2017 | Poder ................. B60R 25/102 |
| 2002/0109587 A1 * | 8/2002 | Attring ............. B60R 25/1004 340/426.1 |

(Continued)

FOREIGN PATENT DOCUMENTS

| JP | 2006-207138 | 8/2006 |
| JP | 2009-138338 | 6/2009 |

(Continued)

OTHER PUBLICATIONS

International Search Report and Written Opinion for International Patent Application No. PCT/JP2016/057361 dated Jun. 14, 2016, 5 pages.

(Continued)

*Primary Examiner* — Thomas S McCormack
(74) *Attorney, Agent, or Firm* — Amin, Turocy & Watson LLP (57) ABSTRACT

A vehicle locking and unlocking control system, comprising: a lock trigger that is provided outside a vehicle and outputs an output signal when operated by a person; a vehicle side transmitter is configured to transmit a transmission request signal according to reception of the output signal output by the lock trigger; a mobile wireless terminal is configured to transmit a response signal according to reception of the transmission request signal transmitted by the vehicle side transmitter; a vehicle side receiver configured to receive the response signal transmitted by the mobile wireless terminal; a locking controller configured to determine whether or not the response signal received by the vehicle side receiver is suitable for a unique identification signal of the vehicle and output a lock signal on the basis of a result of the determination and the reception of the output signal output from the lock trigger; a door lock mechanism configured to lock a door according to the lock signal output by the locking controller; a first determiner configured to (Continued)

determine whether a driving source for driving the vehicle is in an on state or a power supply of the vehicle is in an on state; a second determiner configured to determine whether or not the mobile wireless terminal is outside the vehicle; a door state detector configured to detect an open state of the door; an alarm output unit configured to output an alarm; and an alarm controller configured to cause the alarm output unit to output an alarm after it is determined by the first determiner that the driving source of the vehicle is in an on state or the power supply of the vehicle is in an on state, the output signal output from the lock trigger has been received, and a predetermined period of time has elapsed from a time when it is determined by the second determiner that the mobile wireless terminal is outside the vehicle, and cause the alarm output unit not to output the alarm when it is detected by the door state detector that the door is in the open state before the predetermined period of time elapses.

2 Claims, 4 Drawing Sheets

(51) Int. Cl.
| | | |
|---|---|---|
| *B60R 25/24* | (2013.01) | |
| *B60R 25/31* | (2013.01) | |
| *B60R 25/34* | (2013.01) | |
| *E05B 49/00* | (2006.01) | |
| *E05B 77/44* | (2014.01) | |

(52) U.S. Cl.
CPC .......... *B60R 25/2045* (2013.01); *B60R 25/24* (2013.01); *B60R 25/31* (2013.01); *B60R 25/34* (2013.01); *E05B 49/00* (2013.01); *E05B 77/44* (2013.01); *B60R 2025/1013* (2013.01); *B60R 2325/105* (2013.01); *B60R 2325/205* (2013.01)

(56) References Cited

U.S. PATENT DOCUMENTS

| | | | |
|---|---|---|---|
| 2009/0085720 A1* | 4/2009 | Kurpinski | B60R 25/246 340/5.64 |
| 2015/0109116 A1* | 4/2015 | Grimm | B60R 25/1001 340/426.18 |
| 2015/0116103 A1 | 4/2015 | Yang et al. | |

FOREIGN PATENT DOCUMENTS

| | | |
|---|---|---|
| JP | 2009-174191 | 8/2009 |
| JP | 2012-245964 | 12/2012 |
| JP | 5162653 | 3/2013 |
| JP | 2014-141803 | 8/2014 |

OTHER PUBLICATIONS

Japanese Notice of Allowance for Japanese Patent Application No. 2018-503912 dated Apr. 16, 2019.

* cited by examiner

VEHICLE LOCKING AND UNLOCKING CONTROL SYSTEM

TECHNICAL FIELD

Embodiments described herein relate to a vehicle locking and unlocking control system.

BACKGROUND ART

In the related art, a door lock control device in which, in a case in which an occupant is not inside a vehicle cabin of a vehicle and a power supply of the vehicle is in an on state, an occupant present outside the vehicle is notified that the occupant has forgotten to turn off the power supply of the vehicle when a touch operation with respect to a lock sensor is performed by the occupant present outside the vehicle is known (for example, see Patent Literature 1).

CITATION LIST

Patent Literature

[Patent Literature 1] Japanese Patent No. 5162653

SUMMARY OF INVENTION

Technical Problem

However, in the door lock control device described above, even when the occupant unintentionally performs the touch operation with respect to the lock sensor, the occupant is notified that the occupant has forgotten to turn off the power supply of the vehicle, which may annoy the occupant.

An object to be solved by the present invention is to provide a vehicle locking and unlocking control system that can suppress a notification annoying to an occupant.

Solution to Problem

An invention according to claim 1 is a vehicle locking and unlocking control system (1), including: a lock trigger (26) that is provided outside a vehicle (M) and outputs an output signal when operated by a person; a vehicle side transmitter (55) is configured to transmit a transmission request signal according to reception of the output signal output by the lock trigger; a mobile wireless terminal (10) is configured to transmit a response signal according to reception of the transmission request signal transmitted by the vehicle side transmitter; a vehicle side receiver (50) configured to receive the response signal transmitted by the mobile wireless terminal; a locking controller (36) configured to determine whether or not the response signal received by the vehicle side receiver is suitable for a unique identification signal of the vehicle and output a lock signal on the basis of a result of the determination and the reception of the output signal output from the lock trigger; a door lock mechanism (34, 35) configured to lock a door according to the lock signal output by the locking controller; a first determiner (62) configured to determine whether a driving source for driving the vehicle is in an on state or a power supply of the vehicle is in an on state; a second determiner (64) configured to determine whether or not the mobile wireless terminal is outside the vehicle; a door state detector (22) configured to detect an open state of the door; an alarm output unit (24) configured to output an alarm; and an alarm controller (66) configured to cause the alarm output unit to output an alarm after it is determined by the first determiner that the driving source of the vehicle is in an on state or the power supply of the vehicle is in an on state, the output signal output from the lock trigger has been received, and a predetermined period of time has elapsed from a time when it is determined by the second determiner that the mobile wireless terminal is outside the vehicle, and cause the alarm output unit not to output the alarm when it is detected by the door state detector that the door is in the open state before the predetermined period of time elapses.

An invention according to claim 2 is the vehicle locking and unlocking control system according to claim 1, wherein the lock trigger is provided in a door handle (27) of the vehicle.

Advantageous Effects of Invention

With the invention according to claim 1 or 2, it is possible to suppress a notification annoying the occupant by causing the alarm output unit to output the alarm after it is determined by the first determiner that the driving source of the vehicle is in an on state or the power supply of the vehicle is in an on state, the output signal output from the lock trigger has been received, and the predetermined period of time has elapsed from a time when it is determined by the second determiner that the mobile wireless terminal is outside the vehicle, and causing the alarm output unit not to output the alarm when it is detected by the door state detector that the door is in the open state before the predetermined period of time elapses.

DESCRIPTION OF EMBODIMENTS

Hereinafter, a vehicle locking and unlocking control system according to an embodiment will be described with reference to the drawings.

Figure 1:
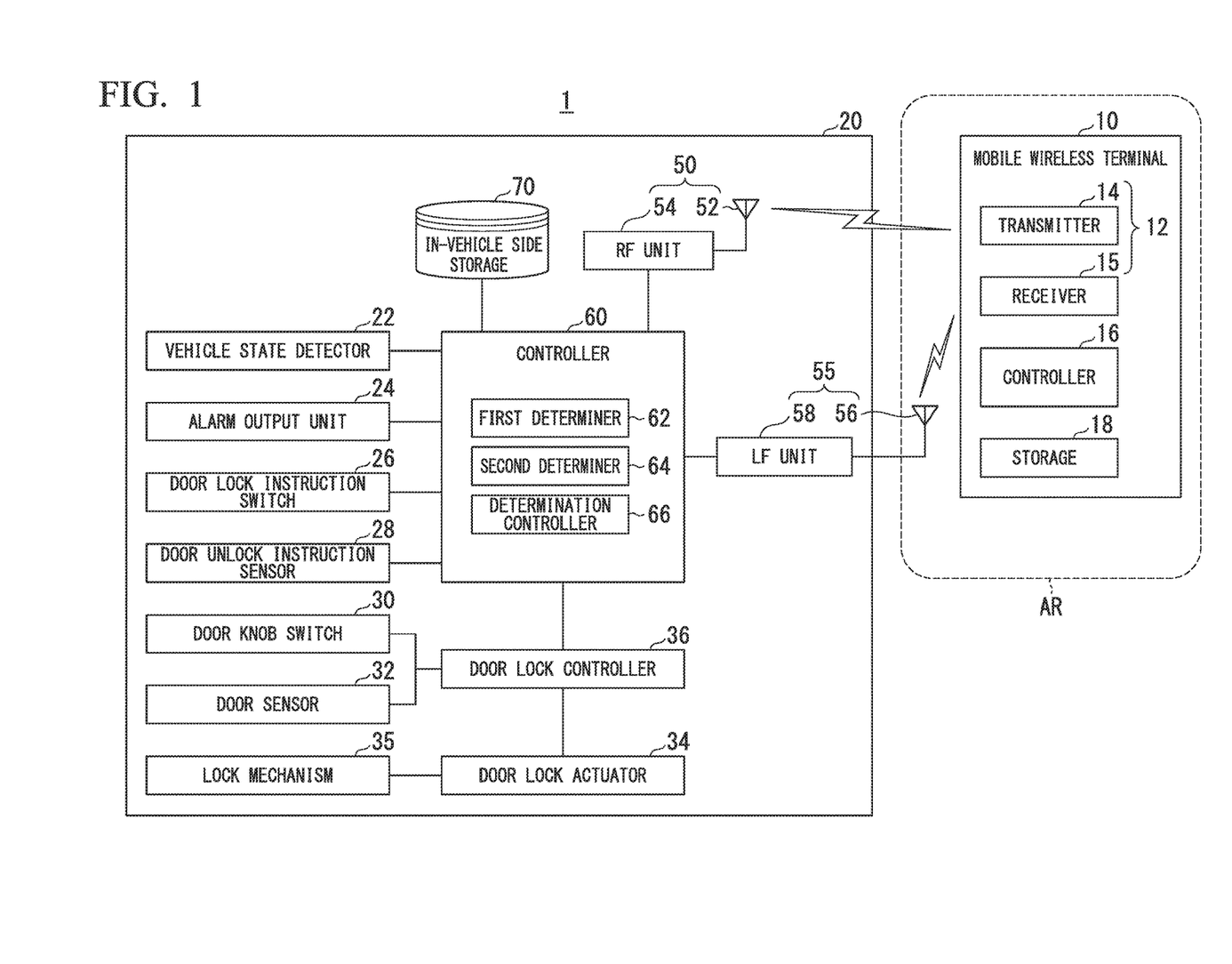
FIG. 1 is a diagram illustrating a configuration example of a vehicle locking and unlocking control system 1 according to an embodiment.

FIG. 1 is a diagram illustrating a configuration example of a vehicle locking and unlocking control system 1 according to an embodiment. The vehicle locking and unlocking control system 1 includes a mobile wireless terminal 10 and an in-vehicle unit 20 mounted on the vehicle.

The mobile wireless terminal 10 includes, for example, a transmission and reception unit 12, a controller 16 including an integrated circuit, and the like, and a storage 18. The mobile wireless terminal 10 includes, for example, a button battery. The mobile wireless terminal 10 is operated by electric power supplied from the button battery.

The transmission and reception unit 12 includes a transmitter 14 and a receiver 15. The transmitter 14 includes, for example, an RF transmission and reception circuit and an RF signal transmission and reception antenna. The RF transmission and reception circuit performs a predetermined process such as amplification or demodulation on the received radio waves or generates radio waves to be transmitted. The RF signal transmission and reception antenna that is connected to the RF transmission and reception circuit and transmits radio waves including an RF signal. The RF signal is, for example, a signal at a frequency of 315 MHz. The receiver 15 includes, for example, an LF reception circuit that performs a predetermined process such as amplification or demodulation on the received radio waves, and an LF signal reception antenna that is connected to the LF reception circuit and receives radio waves including the LF signal. The LF signal is, for example, a signal at a frequency of 125 MHz.

The controller 16 normally controls the mobile wireless terminal 10 in a sleep state which is an electric power saving state. When the controller 16 receives the LF signal that is a request signal from the in-vehicle unit 20, the controller 16 controls the mobile wireless terminal 10 such that it is brought into an activated state from the sleep state. The controller 16 causes the transmitter 14 to transmit radio waves including an RF signal that is a response signal according to the reception of the request signal transmitted by the in-vehicle unit 20. The response signal is a signal including identification information stored in the storage 18 of the mobile wireless terminal 10. An effective transmission range of the radio waves including the LF signal at a low frequency is about 1 m, and an effective transmission range of the radio waves including the RF signal at a high frequency is several times the effective transmission range of the radio waves including the LF signal.

The mobile wireless terminal 10 is a dedicated terminal device such as an electronic key (key fob: FOB). Further, the mobile wireless terminal 10 may be a device to which the above-described functions are given by installing an application program in a mobile phone such as a smartphone, a tablet terminal, or the like.

The in-vehicle unit 20 is mounted on the vehicle. The vehicle on which in-vehicle unit 20 is mounted is, for example, a car such as a three-wheeled car or a four-wheeled car, and includes a car using an internal combustion engine such as a diesel engine or a gasoline engine as a power source, an electric car using an electric motor as a power source, or a hybrid car with the internal combustion engine and the electric motor. Further, the above-described electric car is driven using electric power that is discharged by a battery such as a secondary battery, a hydrogen fuel cell, a metal fuel cell, or an alcohol fuel cell, for example.

The in-vehicle unit 20 includes a vehicle state detector 22, an alarm output unit 24, a door lock instruction switch 26, a door unlock instruction sensor 28, a door knob switch 30, a door sensor 32, a door lock actuator 34, a lock mechanism 35, a door lock controller 36, an RF unit 50, an LF unit 55, a controller 60, and an in-vehicle side storage 70.

The vehicle state detector 22, for example, detects whether or not a power source (for example, an engine) mounted on the vehicle is being activated (ignition is on) and outputs a detection result to the controller 60. The vehicle state detector 22 detects an on state or an off state of the ignition on the basis of a signal output from an electronic controller (ECU) (not illustrated) that controls, for example, an on state or an off state of the ignition.

The alarm output unit 24 outputs an alarm. The alarm output unit is, for example, a speaker that outputs information indicating the on-state of the ignition using speech. The alarm output unit 24 may be a display unit that displays information as an image. The display unit includes, for example, a liquid crystal display (LCD), an organic electroluminescence (EL) display device, and the like. The display unit may be a head-up display that displays an image within a field of view of an occupant (a user of the vehicle) present outside the vehicle M by reflecting the image on a window of the vehicle M. Further, the alarm output unit 24 may be a display unit included in a navigation device, a display unit of an instrument panel that displays a state (a speed or the like) of the vehicle M, a direction indicator, or the like. For example, when the direction indicator outputs information, the direction indicator may light up or blink to output information to the occupant present outside the vehicle.

Figure 2:
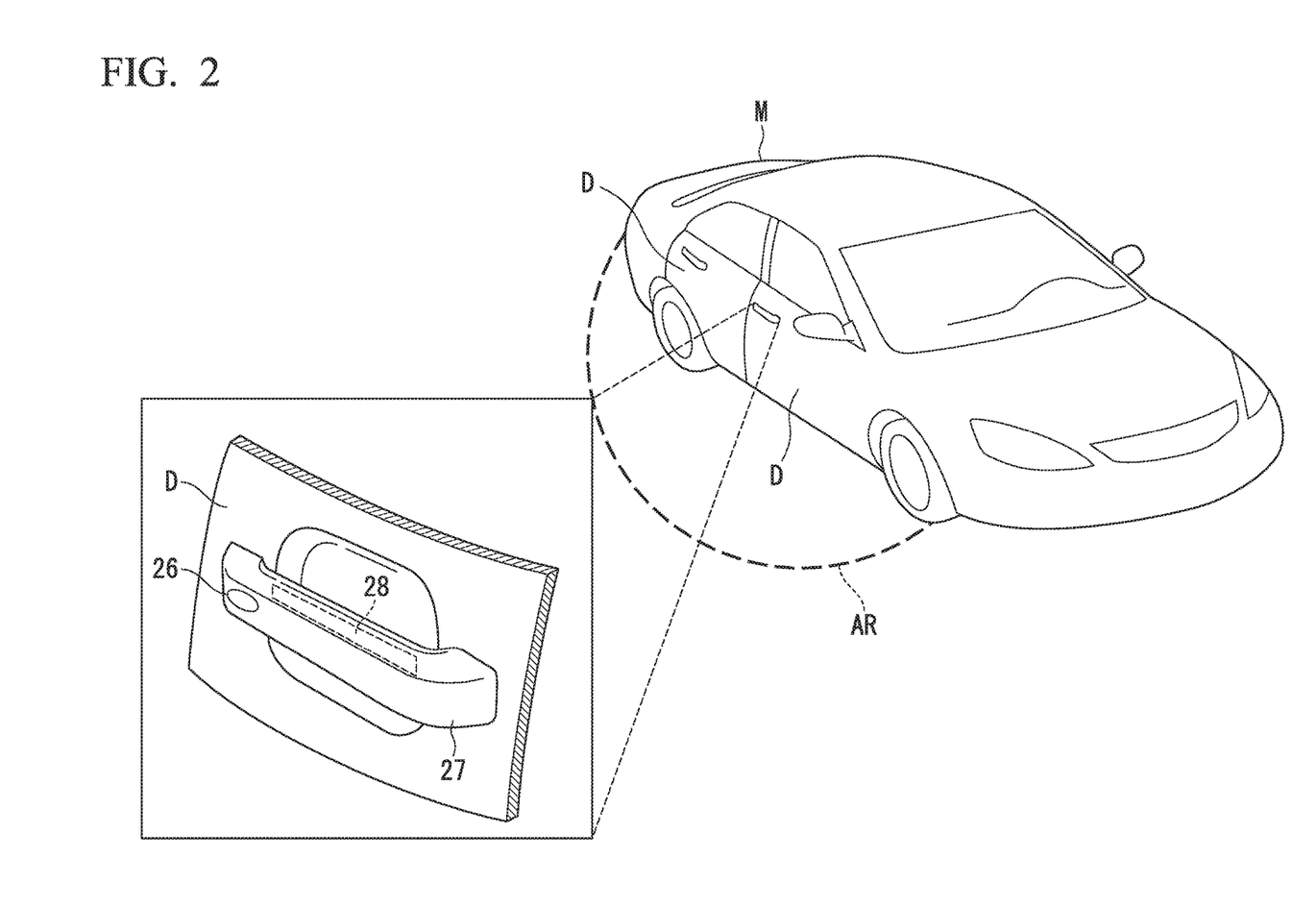
FIG. 2 is a diagram illustrating an example of disposition of a door lock instruction switch 26 and a door unlock instruction sensor 28.

FIG. 2 is a diagram illustrating an example of disposition of the door lock instruction switch 26 and the door unlock instruction sensor 28. The door handle 27 of each door D is disposed in a predetermined position in which it is easy for the occupant to operate the door handle 27. The door lock instruction switch 26 is provided, for example, on the surface side of the door handle 27. The door lock instruction switch 26 is normally in an OFF state. When the door lock instruction switch 26 is operated by the occupant, the door lock instruction switch 26 enters an on state and outputs a lock-on output signal which is a trigger signal for locking a door lock.

The door unlock instruction sensor 28 is provided, for example, inside on the back side of the door handle 27. The door unlock instruction sensor 28 is, for example, a capacitance change type touch sensor of which a capacitance changes when the occupant touches the door handle 27. The door unlock instruction sensor 28 is normally in an off state. When the occupant touches the door handle 27 and the capacitance changes to a predetermined value or more, the door unlock instruction sensor 28 enters an on state and outputs an unlock-on output signal that is a trigger signal for unlocking the door lock.

The door knob switch 30 is provided in a door lining of each door D of the vehicle M. For example, when the occupant performs an operation of manually pushing down a door knob provided in the door lining, the door knob switch 30 sets a door lock mechanism 35 to a locked state. For example, when the occupant manually pushes up the door knob, the door knob switch 30 sets the door lock mechanism 35 to an unlocked state. The door sensor 32, for example, outputs an on signal in a state in which the door is open.

The door lock actuator 34 drives the lock mechanism 35 of the door D provided in the vehicle M. The door lock actuator 34 is provided for each of a plurality of doors D. The door lock actuator 34 moves a latch of the lock mechanism 35 for the door D between a position in an open state and a position in a closed state. The door D of the vehicle M enters a closed state when the latch is engaged with a striker provided on the vehicle body side of the vehicle M and enters an open state when the engagement between the latch and the striker is released. The door lock actuator 34 moves the latch at the position in the closed state to the position in the open state such that the door D enters the open state. The door lock actuator 34 moves the latch at the position in the open state to the position in the closed state such that the door D enters the closed state.

The door lock controller 36 is realized, for example, by a processor such as a central processing unit (CPU) executing a program. The door lock controller 36 is connected to the door knob switch 30, the door sensor 32, the door lock actuator 34, and the controller 60. When the door lock controller 36 receives, for example, a signal for instructing locking or unlocking of the door D of the vehicle M from the controller 60, the door lock controller 36 controls the door lock actuator 34 such that the door D of the vehicle M is locked or unlocked. The door lock controller 36 may be part of the controller 60.

The RF unit 50 is provided, for example, under a surface of the instrument panel. The RF unit 50 includes an RF antenna 52 and an RF reception circuit 54 electrically connected to the RF antenna 52. The RF antenna 52 receives an RF signal transmitted from the mobile wireless terminal 10. The RF reception circuit 54 acquires the RF signal received by the RF antenna 52, performs a process such as amplification and decoding on the acquired RF signal, and outputs information included in the RF signal to the controller 60.

The LF unit 55 includes an LF antenna 56 and an LF reception circuit 58 electrically connected to the LF antenna 56. The LF antenna 56 is provided, for example, in a door mirror on the driver's seat side of the vehicle M, the door handle 27, and the like. The LF reception circuit 58 is provided, for example, under the surface of the instrument panel. In response to the door lock instruction signal output by the door lock instruction switch 26 or the door unlock instruction signal output by the door unlock instruction sensor 28, the LF unit 55 transmits a request signal for requesting transmission of identification information to the mobile wireless terminal 10. A range of an area AR surrounded by a broken line illustrated in FIGS. 1 and 2 described above is an example of an effective communication range of the request signal. The effective communication range of the request signal is set, for example, outside the vehicle M.

When the in-vehicle unit 20 receives an RF signal that is a response to the request signal from the mobile wireless terminal 10 after the in-vehicle unit 20 causes the LF unit 55 to transmit the request signal, the in-vehicle unit 20 executes an outside-vehicle communication process (to be described below) between the mobile wireless terminal 10 and the in-vehicle unit 20.

The controller 60 includes a first determiner 62, a second determiner 64, and a determination controller 66. The first determiner 62, the second determiner 64, and the determination controller 66 are realized, for example, by a processor such as a CPU executing a program. In addition, the functional units may be realized by hardware such as a large scale integration (LSI), an application specific integrated circuit (ASIC), a field-programmable gate array (FPGA), or the like.

The first determiner 62 determines whether or not the ignition of the vehicle M is in the on state on the basis of the detection result of the vehicle state detector 22. The second determiner 64 determines whether or not the mobile wireless terminal 10 is outside the vehicle.

The determination controller 66 causes the alarm output unit 24 to output an alarm when it is determined by the first determiner 62 that the ignition of the vehicle M is in the on state, the lock-on output signal output by the door lock instruction switch 26 has been received, and it has not been detected by the door open state detector that the door D is in the open state within a predetermined period of time from a time when it is determined by the second determiner that the mobile wireless terminal 10 is outside the vehicle. On the other hand, the determination controller 66 causes the alarm output unit 24 not to output an alarm when it is determined by the first determiner 62 that the ignition of the vehicle M is in the on state and or the power supply of the vehicle M is in an on state, the lock-on output signal output by the door lock instruction switch 26 has been received, and it has been detected by the door open state detector that the door D is in the open state within the predetermined period of time from a time when it is determined by the second determiner that the mobile wireless terminal 10 is outside the vehicle.

The in-vehicle side storage 70 is realized by a read only memory (ROM), a random access memory (RAM), a hard disk drive (HDD), a flash memory, or the like. Identification information for being collated with the identification information transmitted from the mobile wireless terminal 10, which is identification information set for the vehicle M, is stored in the in-vehicle side storage 70. A program executed by the door lock controller 36, the controller 60, or the ECU, for example, is stored in the in-vehicle side storage 70.

Figure 3:
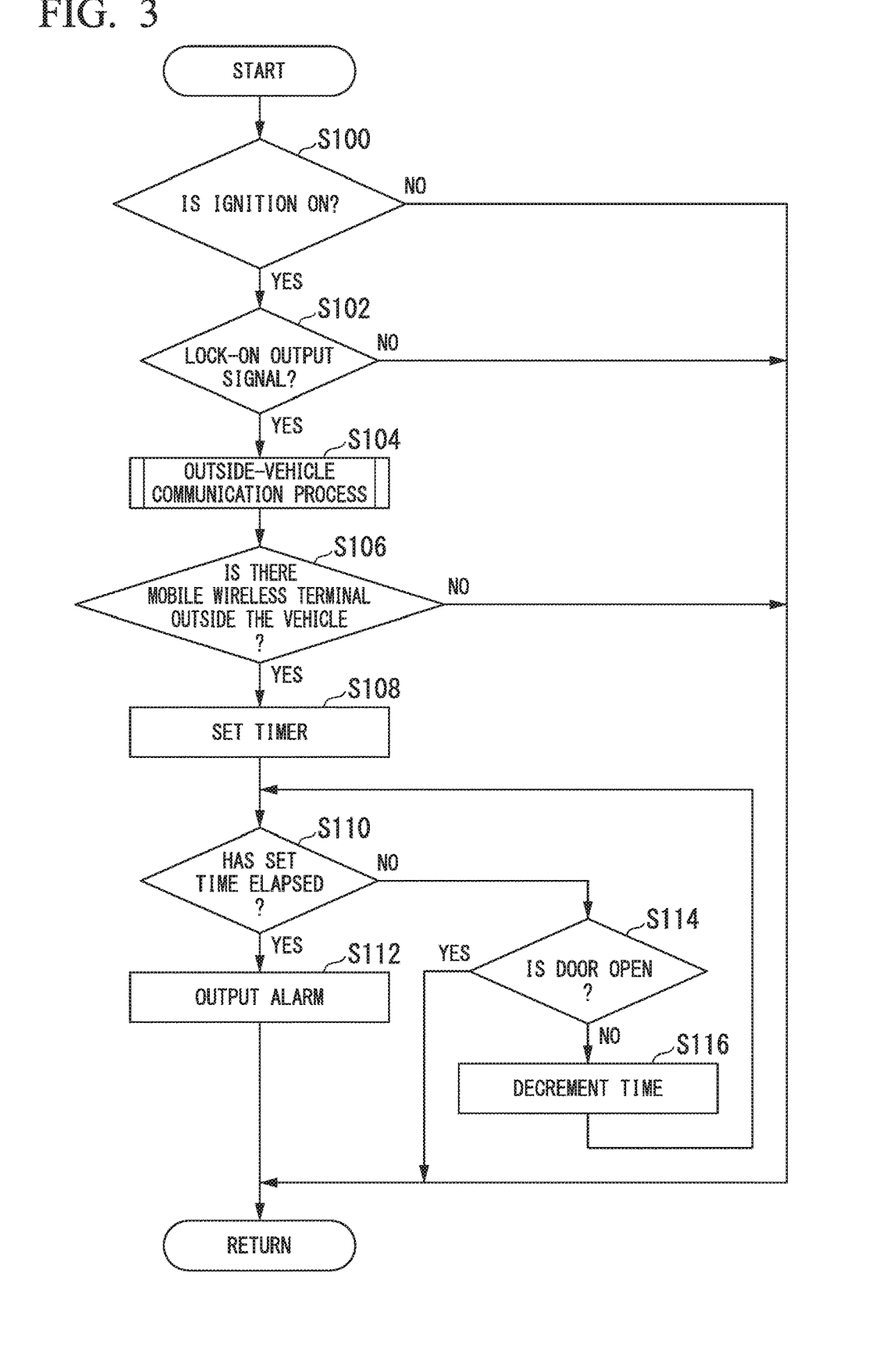
FIG. 3 is a flowchart showing a flow of a process that is executed by a controller 60.

FIG. 3 is a flowchart showing a flow of the process executed by the controller 60. First, the first determiner 62 of the controller 60 determines whether or not the ignition of the vehicle M is in the on state (step S100), on the basis of the detection result of the vehicle state detector 22. When the ignition of the vehicle M is not in the on state, the process of this flowchart ends.

When the ignition of the vehicle M is in the on state, the determination controller 66 of the controller 60 determines whether or not the lock-on output signal output by the door lock instruction switch 26 has been acquired (step S102). When the lock-on output signal output by the door lock instruction switch 26 has not been acquired, the process of this flowchart ends.

When the lock-on output signal output by the door lock instruction switch 26 has been acquired, the controller 60 executes an outside-vehicle communication process (step S104).

Figure 4:
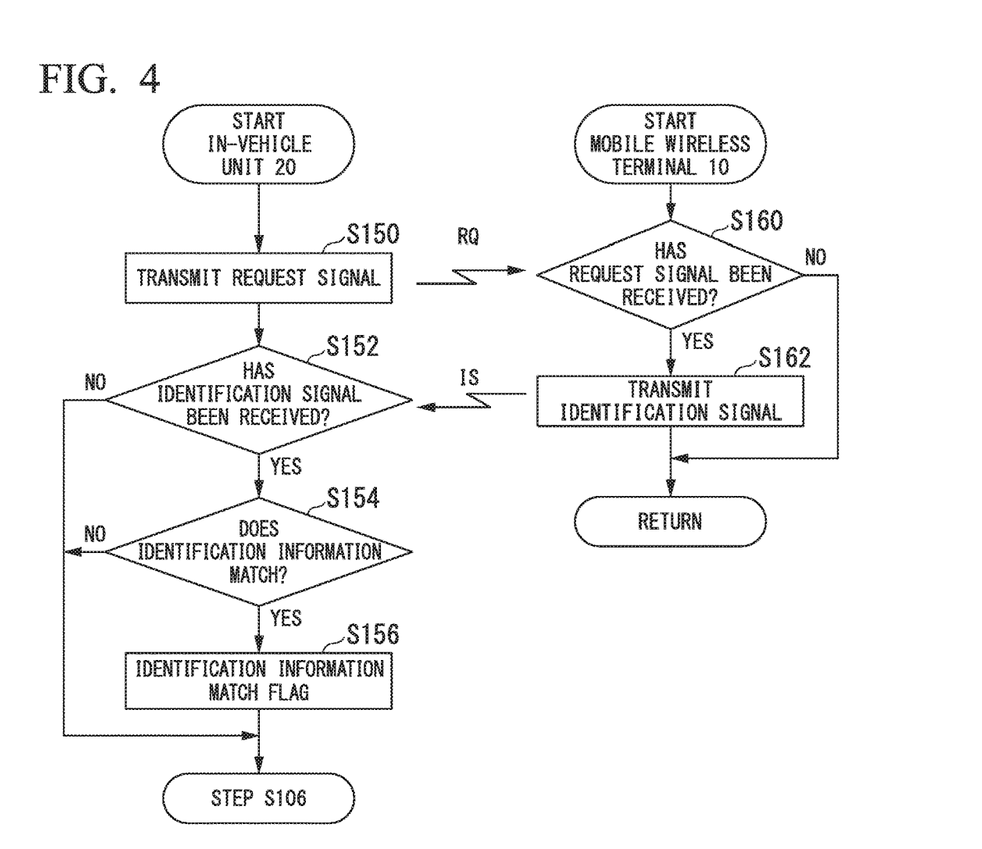
FIG. 4 is a flowchart showing a flow of an outside-vehicle communication process that is executed by a controller 60.

FIG. 4 is a flowchart showing a flow of the outside-vehicle communication process that is executed by the controller 60. First, the controller 60 controls the LF unit 55 such that a request signal RQ for requesting transmission of identification information is transmitted to the mobile wireless terminal 10 (step S150).

Then, a determination is made as to whether or not the mobile wireless terminal 10 has received the request signal RQ (step S160). When the request signal RQ has not been received, the process of this flowchart ends. When the request signal RQ has been received, the mobile wireless terminal 10 transmits radio waves (a response signal) on which an identification signal IS including the identification information preset in the mobile wireless terminal 10 and stored in the storage 18 has been superimposed, to the RF unit 50 of the in-vehicle unit 20 (step S162). Accordingly, the process of the mobile wireless terminal 10 ends.

Then, the controller 60 determines whether or not the radio waves on which the identification signal IS of the mobile wireless terminal 10 has been superimposed has been received by the RF unit 50 (step S152). When the radio waves on which the identification signal IS of the mobile wireless terminal 10 has been superimposed has not been received by the RF unit 50, the process of this flowchart ends. When the radio waves on which the identification signal IS of the mobile wireless terminal 10 has been superimposed has been received by the RF unit 50, the determination controller 66 of the controller 60 determines whether or not the identification information stored in the in-vehicle side storage 70 of the in-vehicle unit 20 matches the identification information of the mobile wireless terminal 10 included in the radio waves received in step S152 (step S154). When the identification information stored in the in-vehicle side storage 70 of the in-vehicle unit 20 does not match the identification information of the mobile wireless terminal 10 included in the radio waves received in step S152, the process of this flowchart ends.

When the identification information stored in the in-vehicle side storage 70 of the in-vehicle unit 20 matches the identification information of the mobile wireless terminal 10 included in the radio waves received in step S152, the determination controller 66 of the controller 60 set an identification information matching flag indicating that the identification information match in step S154 (step S156). Accordingly, the process of the controller 60 ends.

When the door lock instruction switch 26 is operated by the occupant in a state in which the ignition is off and the identification information matching flag is set, locking of the door lock mechanism 35 is performed.

Description of FIG. 3 will be returned to. Then, the second determiner 64 determines whether or not the mobile wireless terminal 10 is outside the vehicle (step S106). For example, when the second determiner 64 controls the LF unit 55 such that a response signal to the request signal transmitted to the mobile wireless terminal 10 is received from the mobile wireless terminal 10, the second determiner 64 determines that the mobile wireless terminal 10 is outside the vehicle. On the other hand, when the second determiner 64 controls the LF unit 55 and does not receive, from the mobile wireless terminal 10, the response signal to the request signal transmitted to the mobile wireless terminal 10, the second determiner 64 determines that the mobile wireless terminal 10 is not outside the vehicle. In this case, the process of this flowchart ends.

It should be noted that the in-vehicle unit 20 may include a plurality of antennas that communicate with the mobile wireless terminal 10. The plurality of antennas include, for example, an in-vehicle antenna that transmits radio waves including a signal different from the signal transmitted by the LF unit 55. An effective communication range of radio waves transmitted by the in-vehicle antenna is set, for example, within the cabin of the vehicle M. When the mobile wireless terminal 10 receives the signal transmitted by the in-vehicle antenna, the mobile wireless terminal 10 transmits a signal different from the response signal to the request signal to the in-vehicle unit 20. The in-vehicle unit 20 may determine whether or not the mobile wireless terminal 10 is outside the vehicle by distinguishing the signal transmitted from the mobile wireless terminal 10.

Further, the in-vehicle unit 20 may determine whether or not the mobile wireless terminal 10 is outside the vehicle on the basis of a strength of radio waves received from a plurality of antennas disposed at different positions. The plurality of antennas disposed at the different positions include, for example, an antenna of which the effective communication range is set outside the vehicle, and an antenna of which the effective communication range is set inside the vehicle.

When the mobile wireless terminal 10 is outside the vehicle, the determination controller 66 sets a timer that measures a predetermined period of time (set time) (step S108). The predetermined period of time is, for example, a period of time of about 1.5 to 3 seconds.

Then, the determination controller 66 determines whether the set time has elapsed (step S110). When the set time has elapsed, the determination controller 66 causes the alarm output unit 24 to output an alarm (step S112). When the door D is not in the open state even when the set time has elapsed in a state in which the ignition is on, the door D is instructed to be locked, and the occupant is outside the vehicle, it is presumed that the occupant has forgotten to turn off the ignition and is about to lock the door D and leave the vehicle M. Therefore, the determination controller 66 causes the alarm output unit 24 to output an alarm and notify the occupant that the occupant has forgotten to turn off the ignition of the vehicle M.

For example, the determination controller 66 may cause the alarm output unit 24 to output an alarm for a predetermined period of time. Further, the determination controller 66 causes the alarm output unit 24 to output the alarm (the process of step S112) and then causes the alarm output unit 24 to stop the output of the alarm when it is detected that the door D has entered the open state and causes the alarm output unit 24 to continue to output the alarm when it is not detected that the door D has entered the open state, instead of causing the alarm output unit 24 to output the alarm for the predetermined period of time.

When the set time has not elapsed, the determination controller 66 determines whether or not the door D of the vehicle M is in the open state on the basis of the detection result of the door sensor 32 (step S114).

When the door D is in the open state, the process of this flowchart ends. In this case, it is presumed that the occupant intends to get in the vehicle M. Further, it is presumed that the occupant has operated the door lock instruction switch 26 without intending to operate to lock the door D (for example, due to an erroneous operation). Thus, when it is presumed that there is an intention to get in the vehicle M or when it is presumed that there is no intention of operating of locking the door D while keeping the ignition in the on state, the determination controller 66 causes the alarm output unit 24 not to output an alarm.

When the door D is not in the open state, the determination controller 66 decrements the time set in the timer (step S116) and returns to the process in step S110. Accordingly, the process of this flowchart ends.

It should be noted that although in step S100, the first determiner 62 determines whether or not the ignition of the vehicle M is in the on state on the basis of the detection result of the vehicle state detector 22, the first determiner 62 may determine whether or not the power supply of the vehicle M is in an on state, instead of this process. In this case, for example, the vehicle state detector 22 detects whether or not the power supply of the vehicle M is in the on state and outputs a detection result to the controller 60. The power supply of the vehicle M being in the on state is a state in which electrical devices such as an audio or car navigation system can be used (accessories on). The vehicle state detector 22 detects an on state or an off state of an accessory, for example, on the basis of a signal output from an ECU (not illustrated) that controls the on state or the off state of the accessory.

Further, although the first determiner 62 determines whether or not the ignition of the vehicle M is in the on state on the basis of the detection result of the vehicle state detector 22 in step S100, the first determiner 62 may determine whether the ignition of the vehicle M is in the on state or the power supply of the vehicle M is in the on state on the basis of the detection result of the vehicle state detector 22, instead of this process.

In addition, although the determination controller 66 determines whether or not the door D of the vehicle M is in the open state on the basis of the detection result of the door sensor 32 in step S114, the determination controller 66 may determine whether the process of the flowchart of FIG. 3 is to be ended or the timer is to be decremented on the basis of the detection result of the door unlock instruction sensor 28, instead of this process. For example, when the capacitance detected by the door unlock instruction sensor 28 has changed by a predetermined value or more, the determination controller 66 may end the process of the flowchart of FIG. 3 without causing the alarm output unit 24 to output an alarm. This is because, in this case, it is presumed that the driver has grasped the door handle and the driver intends to open the door D. It should be noted that, when the capacitance detected by the door unlock instruction sensor 28 approaches the capacitance before the change before the door D enters the open state (for example, when the occupant grips the door handle 27 of the door D, but releases a hand of the occupant from the door handle 27 before the door D enters the open state), the determination controller 66 may cause the alarm output unit 24 to output an alarm or may return to the process of step S108.

Here, for example, a case may be assumed in which the driver gets out of the vehicle, leaves the vehicle M without locking the door lock, the driver completes his or her affairs, and then the driver returns to the vehicle M in a state in which the ignition is in the on state. In this case, when the driver operates the door handle 27, the driver may unintentionally touch the door lock instruction switch 26 provided on the door handle 27. In this case, when control is performed to cause the alarm output unit 24 to immediately output the alarm in a state in which the ignition is on, the lock-on output signal for locking the door lock is output, and the mobile wireless terminal 10 is outside the vehicle, the driver may be annoyed. This is because the alarm output unit 24 outputs the alarm even though the driver does not intend to lock the door D.

On the other hand, in the vehicle locking and unlocking control system 1 according to the present embodiment, even when the ignition is on, the lock-on output signal for locking the door lock is output, and the mobile wireless terminal 10 is outside the vehicle, control is performed so that the alarm output unit 24 is not caused to output an alarm when the door of the vehicle M is opened by the occupant before the set time elapses. Accordingly, the vehicle locking and unlocking control system 1 can suppress causing annoyance for the driver.

Figure 5:
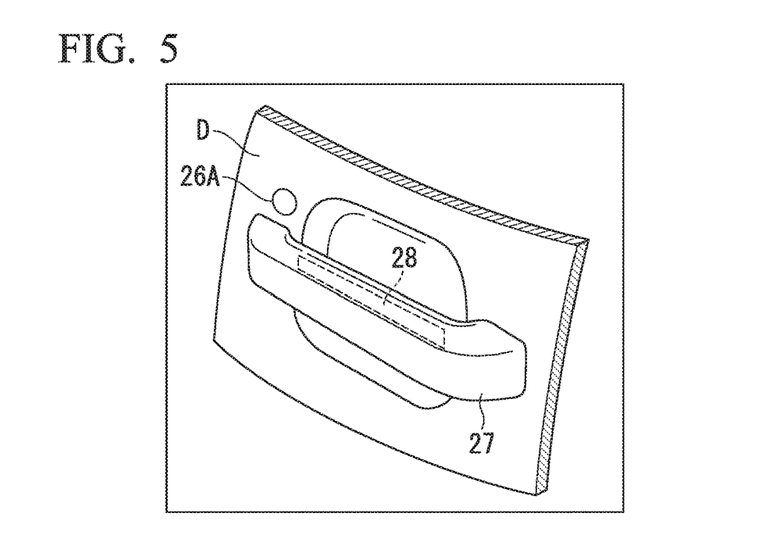
FIG. 5 is a diagram illustrating an example in which a door lock instruction switch 26A is provided in a direction (vertically) above a door handle 27.

It should be noted that although the door lock instruction switch 26 has been described as being provided on the front surface side of the door handle 27 in the present embodiment, the door lock instruction switch 26 may be provided on the rear surface side of the door handle 27, the vicinity of the door handle 27, or the like. FIG. 5 is a diagram illustrating an example in which the door lock instruction switch 26A is provided in a direction (vertically) above the door handle 27.

According to the vehicle locking and unlocking control system 1 of the embodiment described above, the in-vehicle unit 20 performs control such that the alarm output unit 24 is caused not to output an alarm when it is determined that the ignition of the vehicle M is in the on state or the power supply of the vehicle M is in the on state, the output signal output from the door lock instruction switch 26 has been received, and it is detected by the door sensor 32 that the door D is in the open state before the set time elapses from a time when it is determined that the mobile wireless terminal 10 is outside the vehicle. Thus, it is possible to suppress a notification annoying the occupant.

Although several embodiments of the present invention have been described, the embodiments have been presented by way of example and are not intended to limit the scope of the invention. These embodiments can be implemented in various other forms, and various omissions, substitutions, and changes can be made without departing from the gist of the invention. These embodiments or modifications thereof are included in the invention described in the claims and the scope of equivalents thereof, as they are included in the scope or gist of the invention.

REFERENCE SIGNS LIST

1 Vehicle locking and unlocking control system
10 Mobile wireless terminal
12 Transmission and reception unit
16 Controller
18 Storage
20 In-vehicle unit
22 Vehicle state detector
24 Alarm output unit
26 Door lock instruction switch
28 Door unlock instruction sensor
30 Door knob switch
32 Door sensor
34 Door lock actuator
35 Lock mechanism
36 Door locking controller
50 RF unit
55 LF unit
60 Controller
62 First determiner
64 Second determiner
66 Determination controller
70 In-vehicle side storage

What is claimed is:

1. A vehicle locking and unlocking control system, comprising:
   a lock trigger that is provided outside a vehicle and outputs an output signal when operated by a person;
   a vehicle side transmitter is configured to transmit a transmission request signal according to reception of the output signal output by the lock trigger;
   a mobile wireless terminal is configured to transmit a response signal according to reception of the transmission request signal transmitted by the vehicle side transmitter;
   a vehicle side receiver configured to receive the response signal transmitted by the mobile wireless terminal;
   a locking controller configured to determine whether or not the response signal received by the vehicle side receiver is suitable for a unique identification signal of the vehicle and output a lock signal on the basis of a result of the determination and the reception of the output signal output from the lock trigger;
   a door lock mechanism configured to lock a door according to the lock signal output by the locking controller;
   a first determiner configured to determine whether a driving source for driving the vehicle is in an on state or a power supply of the vehicle is in an on state;
   a second determiner configured to determine whether or not the mobile wireless terminal is outside the vehicle;
   a door state detector configured to detect an open state of the door;
   an alarm output unit configured to output an alarm; and
   an alarm controller configured to cause the alarm output unit to output an alarm after it is determined by the first determiner that the driving source of the vehicle is in an on state or the power supply of the vehicle is in an on state, the output signal output from the lock trigger has been received, and a predetermined period of time has elapsed from a time when it is determined by the second determiner that the mobile wireless terminal is outside the vehicle, and cause the alarm output unit not to output the alarm when it is detected by the door state detector that the door is in the open state before the predetermined period of time elapses.

2. The vehicle locking and unlocking control system according to claim 1,
wherein the lock trigger is provided in a door handle of the vehicle.

\* \* \* \* \*